United States Patent
Shiga

(10) Patent No.: US 8,707,540 B2
(45) Date of Patent: Apr. 29, 2014

(54) METHOD OF MANUFACTURING A LEADER MEMBER IN RECORDING TAPE CARTRIDGE

(75) Inventor: Hideaki Shiga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 908 days.

(21) Appl. No.: 12/754,635

(22) Filed: Apr. 6, 2010

(65) Prior Publication Data

US 2010/0258666 A1    Oct. 14, 2010

(30) Foreign Application Priority Data

Apr. 13, 2009  (JP) ................................. 2009-096782

(51) Int. Cl.
  *B23P 17/00*  (2006.01)
  *B22D 23/00*  (2006.01)
  *G11B 23/107*  (2006.01)

(52) U.S. Cl.
  USPC ...................................... 29/527.5; 242/332.4

(58) Field of Classification Search
  USPC ...................................... 29/527.5; 242/332.4
  See application file for complete search history.

(56) References Cited

U.S. PATENT DOCUMENTS

| 6,445,539 | B1 * | 9/2002 | Morita et al. | 360/132 |
| 6,953,169 | B2 * | 10/2005 | Morita et al. | 242/326.2 |
| 2001/0013560 | A1 | 8/2001 | Eaton et al. | |
| 2003/0189119 | A1 * | 10/2003 | Morita et al. | 242/332.4 |
| 2006/0162494 | A1 | 7/2006 | Soda et al. | |

FOREIGN PATENT DOCUMENTS

| JP | 1-283340 | 11/1989 |
| JP | 6-279914 | 10/1994 |
| JP | 11185438 A * | 7/1999 |
| JP | 2000-011596 | 1/2000 |
| JP | 2002-510837 | 4/2002 |
| JP | 2003-301968 | 10/2003 |
| JP | 2004-263294 | 9/2004 |
| JP | 3952101 B2 | 8/2007 |

OTHER PUBLICATIONS

Partial English language translation of the following: Office action dated Oct. 23, 2012 from the Japanese Patent Office in a Japanese patent application corresponding to the instant patent application. This office action translation is submitted now in order to supplement the understanding of patent document JP2002-510837, JP06-279914, JP2004-263294 ,JP1-283340,JP2003-301968 and JP2000-011596 which are cited in the office action and are being disclosed in the instant Information Disclosure Statement.

* cited by examiner

*Primary Examiner* — Jermie Cozart
(74) *Attorney, Agent, or Firm* — SOLARIS Intellectual Property Group, PLLC

(57) ABSTRACT

The present invention provides a leader member in a recording tape cartridge that has excellent productivity, even though the leader member is manufactured with stainless steel, a manufacturing method thereof, and the recording tape cartridge. A leader member that is attached to a free end of a recording tape wound around a single reel accommodated in a case and that is pulled out from an opening formed in the case by an pull out member of a drive device is manufactured by metal injection molding of stainless steel.

3 Claims, 15 Drawing Sheets

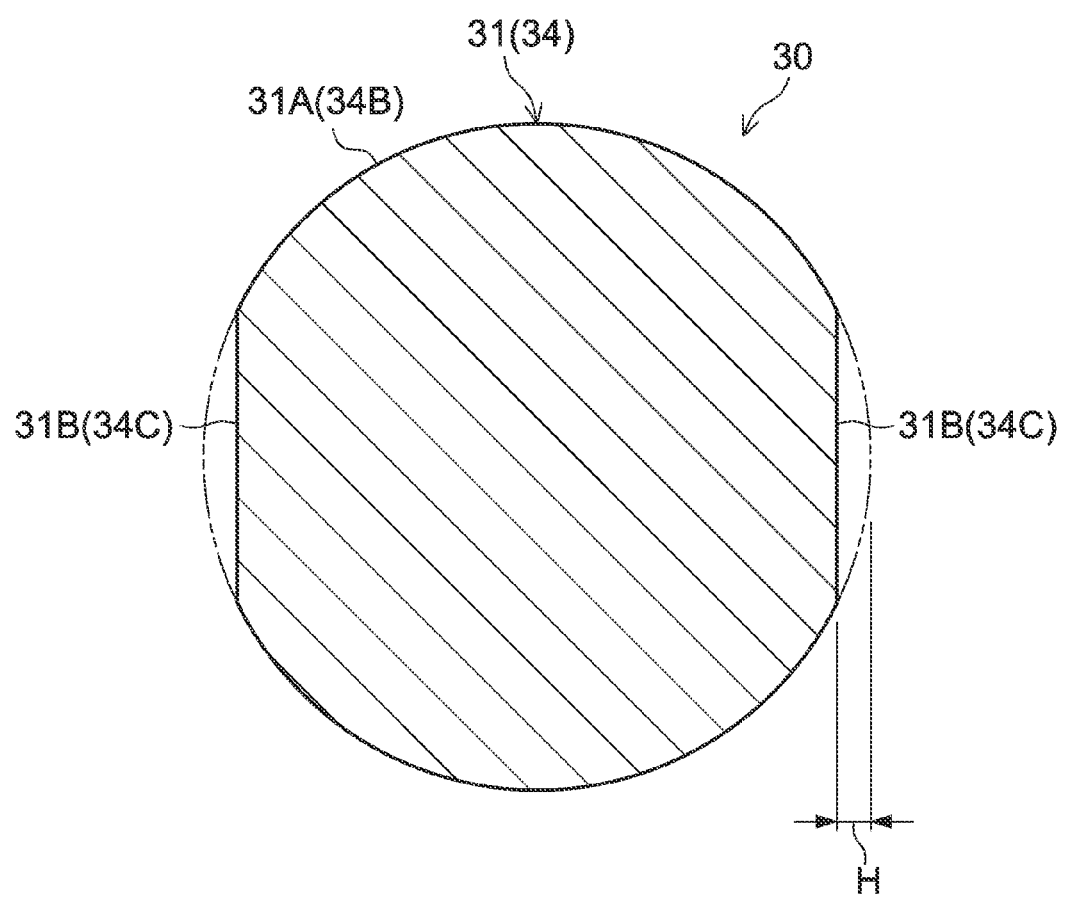

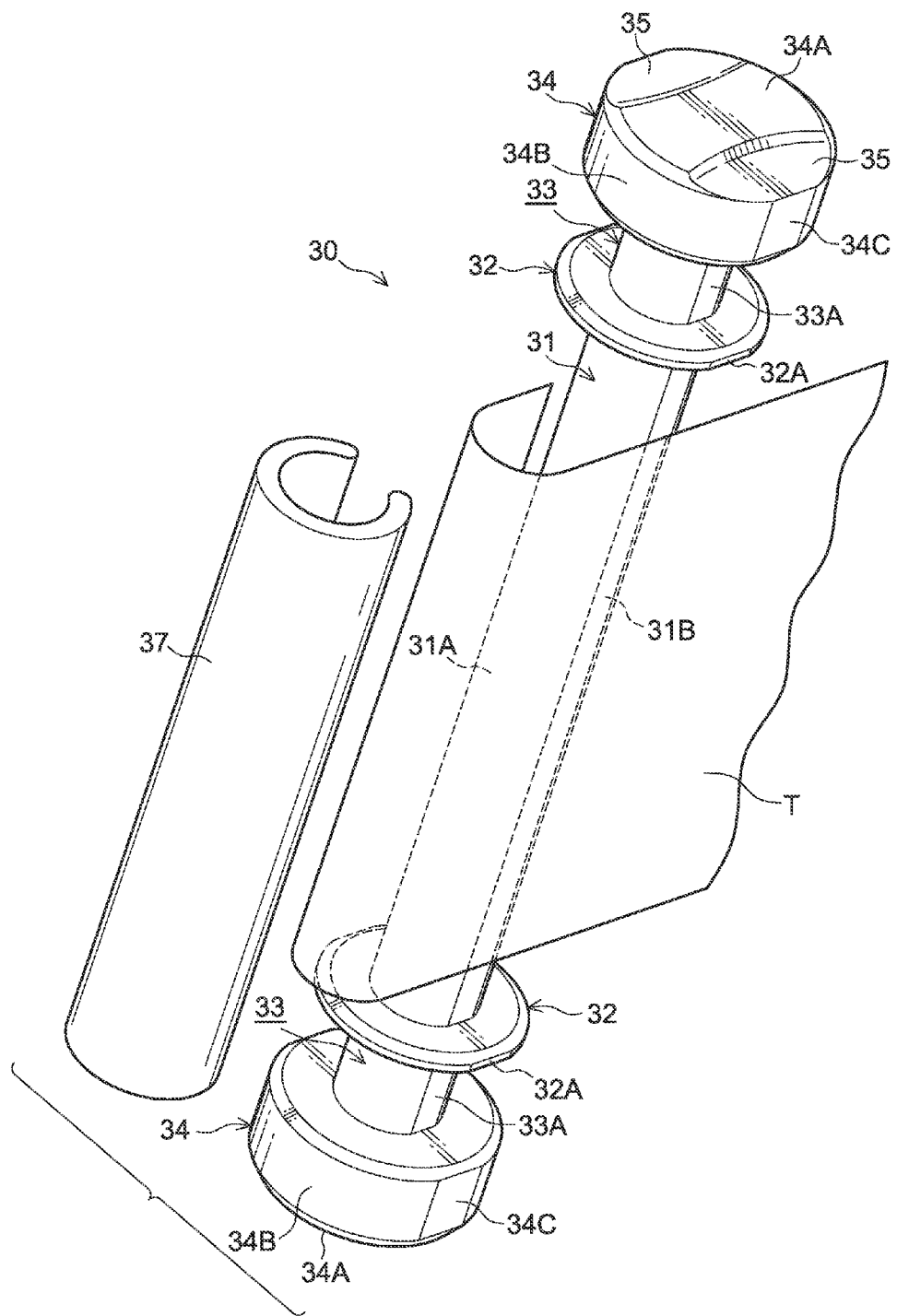

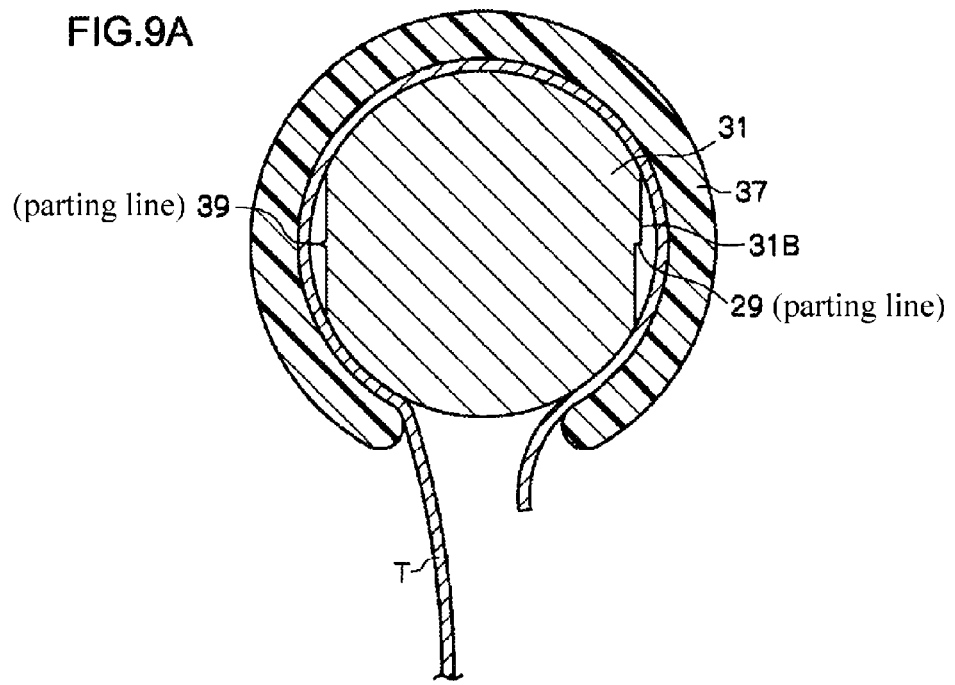
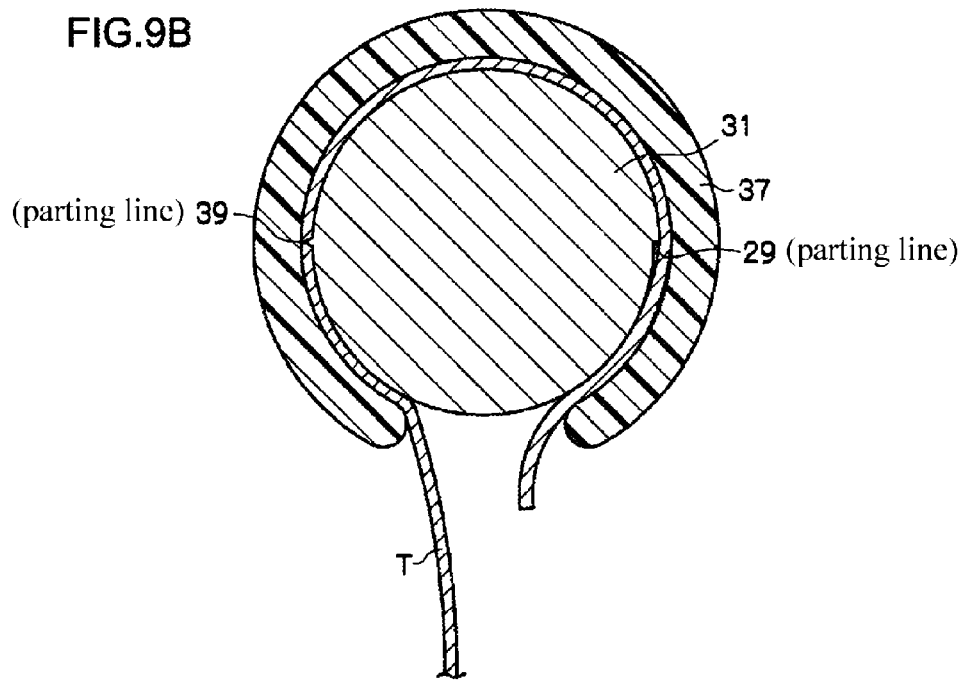

METHOD OF MANUFACTURING A LEADER MEMBER IN RECORDING TAPE CARTRIDGE

CROSS-REFERENCE TO RELATED APPLICATION

This application claims priority under 35 USC 119 from Japanese Patent Application No. 2009-096782 filed Apr. 13, 2009, the disclosure of which is incorporated by reference herein.

BACKGROUND OF THE INVENTION

1. Technical Field

The present invention relates to a recording tape cartridge that accommodates a single reel on which a recording tape, such as a magnetic tape, which is mainly used as a record and reproduction medium of a computer, is wound, a leader member that is configured such that the recording tape is pulled out by a pulling out member of a drive device, and a manufacturing method of the leader member.

2. Related Art

Conventionally, a recording tape cartridge where a recording tape, such as a magnetic tape, which is used as a data record and reproduction medium of a computer (data backup), is wound around a reel and the single reel is mounted in a case has been known. A free end of the recording tape is mounted with a leader member for which a pull out member of a drive device is engaged and pulls out.

As the leader member, a leader pin that is configured to have an approximately array shape is known, and this leader pin is manufactured with plastic (including fiber-reinforced plastic based on such as carbon fiber) or stainless steel (for example, refer to Japanese Patent No. 3952101).

However, in the leader pin that is manufactured with the plastic (including fiber-reinforced plastic based on such as carbon fiber), strength and rigidity may be deteriorated as compared with a leader pin manufactured with metal. Although depending on a type of the plastic or a counterpart material, a low frictional property and abrasion resistance of the plastic may be deteriorated as compared with the metal.

Meanwhile, the leader pin that is manufactured with stainless steel is excellent in terms of strength, rigidity, corrosion resistance, a low frictional property, and abrasion resistance. However, the manufacturing method of the leader pin is mainly implemented by cutting, and it may take about 20 to 60 sec. to process each leader pin. That is, in the leader pin that is manufactured by cutting the stainless steel, productivity is low as compared with a leader pin made of plastic that may be manufactured by injection molding (processing of one shot is enabled for about 10 to 20 sec.)

SUMMARY OF THE INVENTION

The present invention has been made in view of the above-described circumferences and the invention provides a leader member in a recording tape cartridge that has excellent productivity even though the leader member is manufactured with stainless steel, a manufacturing method thereof, and a recording tape cartridge.

A leader member in a recording tape cartridge according to a first aspect of the invention is attached to a free end of a recording tape wound around a single reel accommodated in a case, and that is pulled out from an opening formed in the case by a pull out member of a drive device, the leader member is manufactured by metal injection molding of stainless steel.

According to the first aspect the invention, since the leader member made of stainless steel is manufactured by the metal injection molding, productivity is improved as compared with a case where a leader member is manufactured by cutting.

According to a leader member in a recording tape cartridge according to a second aspect of the invention, in the leader member in the recording tape cartridge according to the first aspect, the leader member is a leader pin, and a dimension of a portion corresponding to a parting line in an axial direction of the leader pin is reduced.

By the dimension reduction, a distance from an axis center of the leader pin to an outer circumferential surface of the leader pin at the portion corresponding to the parting line is shorter than a distance from the axis center of the leader pin to an outer circumferential surface of the leader pin at a portion other than the portion corresponding to the parting line.

According to the second aspect of the invention, when the recording tape is fixed to the leader pin, the recording tape can be prevented from being cut by a burr or the like formed in the parting line.

It is possible that a substantially planar portion is formed at the leader pin by the dimension reducing.

According to a leader member in a recording tape cartridge according to a third aspect of the invention, in the leader member in the recording tape cartridge according to the first aspect, the leader member is a leader pin having a body on which the free end of the recording tape is wound, and a dimension of at least a portion corresponding to a parting line in an axial direction of the body is reduced.

According to the third aspect of the invention, when the recording tape is fixed to the leader pin, the recording tape can be prevented from being cut by a burr or the like formed in the parting line.

It is possible that substantially planar portion is formed at the body by the dimension reduction.

According to a leader member in a recording tape cartridge according to a fourth aspect of the invention, in the leader member in the recording tape cartridge according to any one of the first to third aspects, the leader member is a leader pin that has head portions on both ends thereof, and a notch portion is formed in at least one of the head portions, the notch portion being configured such that a gate mark, which is formed at the at least one of the head portions when the leader pin is manufactured, does not protrude further than a top surface of the at least one of the head portions.

According to the fourth aspect the invention, when the leader pin is held in the case, hindrance of holding by the gate mark can be prevented.

It is further possible that the leader member is a leader pin that has head portions on both ends thereof, and a notch portion is formed in the head portion, the notch portion being configured such that a mark of a pushed portion which is to be pushed by a pushing member, the mark being formed at the head portion when the leader pin is manufactured, does not protrude further than a top surface of the head portion.

A recording tape cartridge according to a fifth aspect of the invention, includes a single reel around which a recording tape where the leader member of any one of the first to fourth aspects is attached to the free end is wound; and a case that rotatably accommodates the reel.

According to the fifth aspect of the invention, since the leader member made of stainless steel is manufactured by the metal injection molding, productivity is improved as compared with a case where a leader member is manufactured by cutting. Since the leader member is manufactured with stainless steel, the leader member is excellent in terms of the strength, the rigidity, the corrosion resistance, the low frictional property, and the abrasion resistance.

In a method of manufacturing a leader member in a recording tape cartridge according to a sixth aspect of the invention, the leader member is attached to a free end of a recording tape wound around a single reel accommodated in a case, and that is pulled out from an opening formed in the case by a pull out member of a drive device, the method comprises metal injection molding of stainless steel to form the leader member.

According to the sixth aspect of the invention, since the leader member made of stainless steel is manufactured by the metal injection molding, productivity is improved as compared with a case where a leader member is manufactured by cutting.

According to a method of manufacturing a leader member in a recording tape cartridge according to a seventh aspect of the invention, in the method of manufacturing a leader member in a recording tape cartridge according to the sixth aspect, the leader member is a leader pin, and a dimension of a portion corresponding to a parting line in an axial direction of the leader pin is reduced.

By the dimension reduction, a distance from an axis center of the leader pin to an outer circumferential surface of the leader pin at the portion corresponding to the parting line is shorter than a distance from the axis center of the leader pin to an outer circumferential surface of the leader pin at a portion other than the portion corresponding to the parting line.

According to the seventh aspect of the invention, when the recording tape is fixed to the leader pin, the recording tape can be prevented from being cut by a burr or the like formed in the parting line.

According to a method of manufacturing a leader member in a recording tape cartridge according to an eighth aspect of the invention, in the method of manufacturing a leader member in a recording tape cartridge according to the sixth aspect, the leader member is a leader pin having a body on which the free end of the recording tape is wound, and a dimension of at least a portion corresponding to a parting line in an axial direction of the body is reduced.

According to the eighth aspect of the invention, when the recording tape is fixed to the leader pin, the recording tape can be prevented from being cut by a burr or the like formed in the parting line.

According to a method of manufacturing a leader member in a recording tape cartridge according to a ninth aspect of the invention, in the method of manufacturing a leader member in a recording tape cartridge according to any one of the sixth to eighth aspects, the leader member is a leader pin that has head portions on both ends thereof, and a notch portion is formed in at least one of the head portions, the notch portion being configured such that a gate mark, which is formed at the at least one of the head portions when the leader pin is manufactured, does not protrude further than a top surface of the at least one of the head portions.

According to the ninth aspect of the invention, when the leader pin is held in the case, hindrance of holding by the gate mark can be prevented.

As such, according to the aspects of the invention, the leader member in the recording tape cartridge having excellent productivity even when the leader member is manufactured with stainless steel, the manufacturing method thereof, and the recording tape cartridge is provided.

BRIEF DESCRIPTION OF THE DRAWINGS

Embodiments of the present invention will be described in detail with reference to the following figures, wherein:

FIG. 7 is a schematic cross-sectional view illustrating the leader pin after the thickness of a portion corresponding to a parting line is reduced;

FIG. 8 is a schematic exploded perspective view illustrating the leader pin before a recording tape is mounted by a tape locking member;

FIG. 9A is a schematic cross-sectional view illustrating a leader pin according to an exemplary embodiment after the recording tape is mounted by the tape locking member;

FIG. 9B is a schematic cross-sectional view illustrating a leader pin according to a comparative example after the recording tape is mounted by the tape locking member;

DETAILED DESCRIPTION OF THE INVENTION

Hereinafter, an exemplary embodiment according to the present invention will be described in detail based on the accompanying drawings. For convenience of explanation, in FIG. 1, a loading direction of a recording tape cartridge 10 to a drive device is illustrated by an arrow FR and the loading direction is assumed as a forward direction (a front side) of the recording tape cartridge 10. A direction of an arrow RI that is orthogonal to the arrow FR is assumed as a rightward direction (a right side). A direction that is orthogonal to the direction of the arrow FR and the direction of the arrow RI is illustrated by an arrow UP and this direction is assumed as an upward direction (an upper side) of the recording tape cartridge 10. First, the recording tape cartridge 10 will be simply described.

Figure 1:
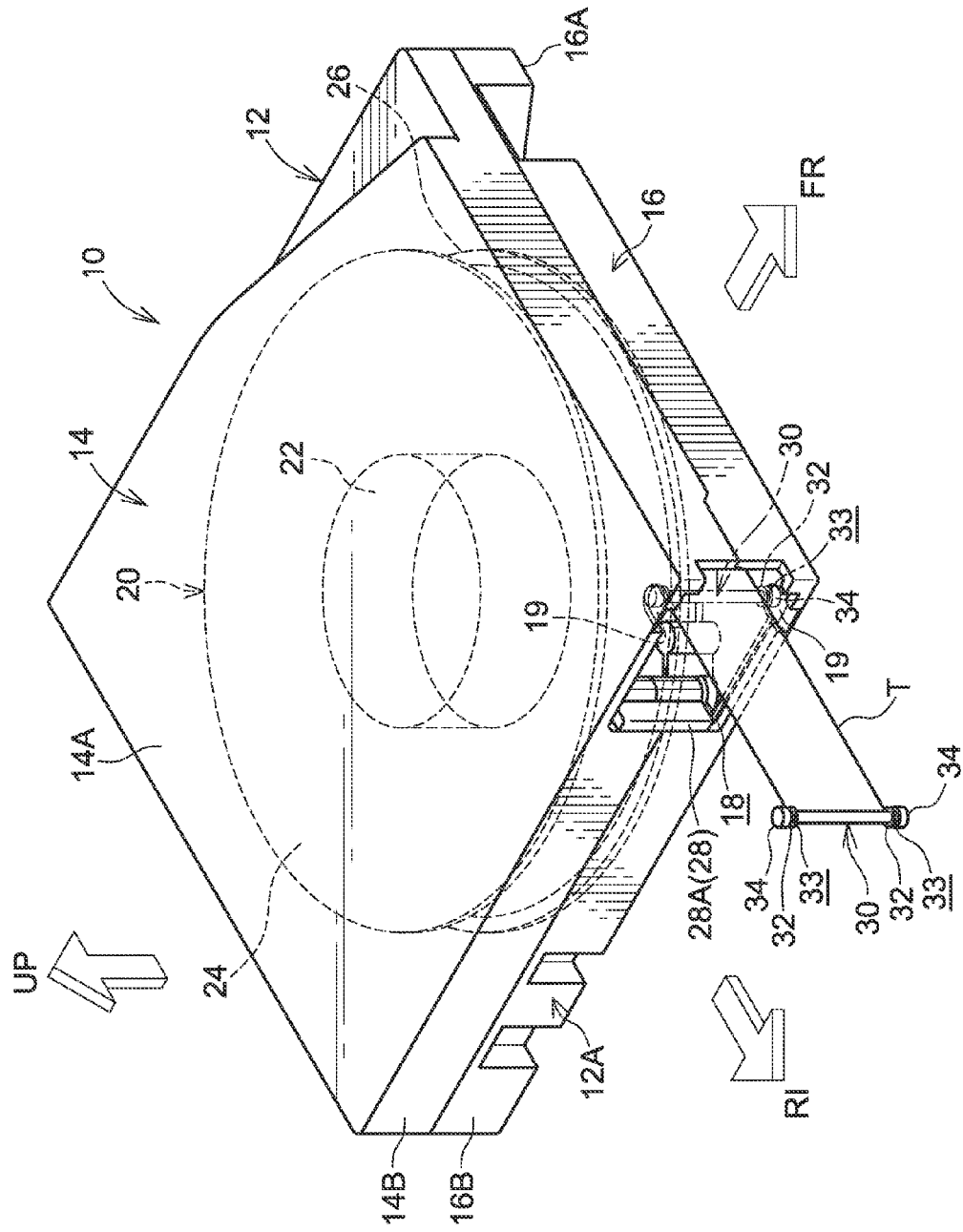
FIG. 1 is a schematic perspective view illustrating a recording tape cartridge including a leader pin.

As illustrated in FIG. 1, the recording tape cartridge 10 has a box-like case 12 that has an approximately rectangular shape. The case 12 is configured such that an upper case 14 and a lower case 16 made of a resin are bonded by a machine screw or the like in a state where the upper case 14 and the lower case 16 cause a peripheral wall 14B erected on an edge of a ceiling (top) plate 14A and a peripheral wall 16B erected on an edge of a bottom plate 16A to abut each other. In the case 12, only a single reel 20 made of a resin is rotatably accommodated.

The reel 20 includes a reel hub 22 that constitutes an axis center portion and is shaped as a cylindrical tube having a bottom, a lower flange 26 that is provided on a lower end of the reel hub 22, and an upper flange 24 that is provided on an upper end of the reel hub 22. A recording tape T, such as a magnetic tape, which functions as an information record and reproduction medium, is wound around an outer circumferential surface of the reel hub 22, and ends of the wound recording tape T in a width direction are held by the upper flange 24 and the lower flange 26.

On a lower surface of a bottom wall of the reel hub 22, a reel gear (not illustrated) is formed in a circular shape. In an approximately central portion of the lower case 16, a gear opening (not illustrated) from which exposes the reel gear to the outside is provided. The reel gear that is exposed from the gear opening is meshed with a driving gear (not illustrated) that is formed at a rotation shaft of a drive device (not illustrated) and is rotated, and the reel 20 is relatively rotatable with respect to the case 12.

On a right wall 12A of the case 12, an opening 18 that is used to pull out the recording tape T wound around the reel 20 is formed. To a free end of the recording tape T that is pulled out from the opening 18, a leader pin 30 that is pulled out by an pull out member (not illustrated) of the drive device while being caught (engaged) is fixed.

Figure 2:
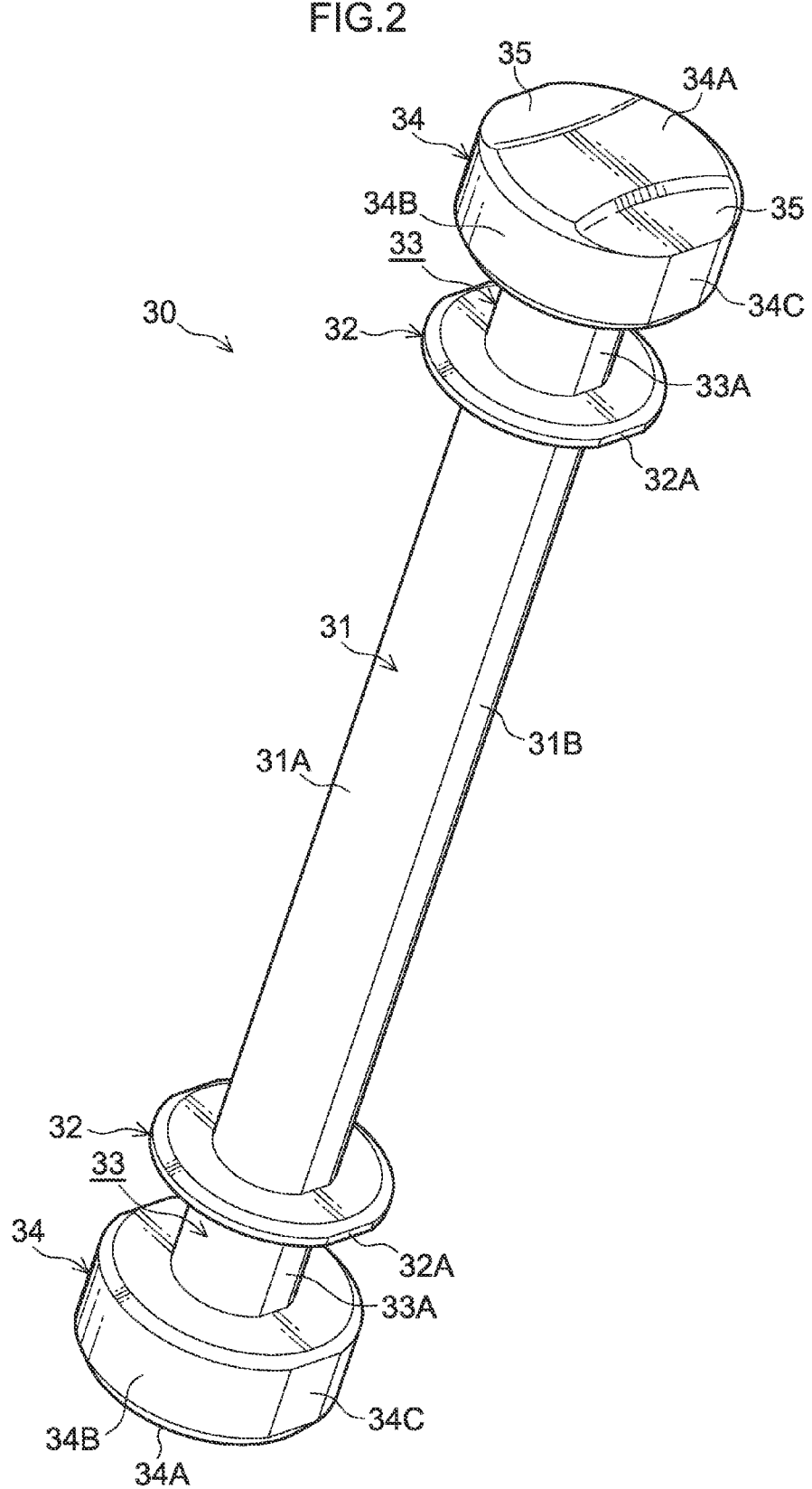
FIG. 2 is a schematic perspective view illustrating the leader pin.

As illustrated in detail in FIG. 2, in the leader pin 30, head portions 34 that have a thick plate shape are integrally provided on both ends in an axial direction of a body 31 having a cylindrical shape. At predetermined positions of the body 31 at the inside of the axial direction of the head portions 34, flange portions 32 that have a thin plate shape are integrally provided at a predetermined distance.

The free end of the recording tape T is fixed to the body 31 between the flange portions 32, and each space between the flange portion 32 and the head portion 34 is configured to be a ring groove 33 where a hook of the pull out member of the drive device is caught.

As illustrated in FIG. 1, on the inner side of the opening 18 of the case 12, that is, on an inner surface of the ceiling plate 14A of the upper case 14 and on an inner surface of the bottom plate 16A of the lower case 16, a pair of upper and lower pin holding portions 19 that position and hold the leader pin 30 within the case 12 are provided.

The pin holding portion 19 has an approximately semicircular shape in which the pull out side of the recording tape T is opened, and the head portion 34 of the leader pin 30 which is in an erected state can enter in or exit from the pin holding portion 19 from the opening side thereof. An outer surface 34A (refer to FIG. 2) that contacts the pin holding portion 19 of the head portion 34 is formed in an approximately spherical surface shape.

In the vicinity of the pin holding portion 19, a plate spring (not illustrated) is fixedly disposed. In the plate spring, a fork shaped tip end of the plate spring is each engaged with a peripheral surface 34B (refer to FIG. 2B) of the head portion 34 of the leader pin 30 and the leader pin 30 is held by the pin holding portion 19. When the leader pin 30 enters in or exits from the pin holding portion 19, the tip end of the plate spring is appropriately elastically deformed and allows the movement of the leader pin 30.

The opening 18 is opened or closed by a door 28. The door 28 is formed in an approximately rectangular plate shape with a size that enables closing of the opening 18, and is biased by a biasing member (not illustrated) in a direction toward which the opening 18 is closed. On a front end of the door 28, a convex portion 28A for an opening and closing operation protrudes outward. The convex portion 28A is engaged with an opening/closing member (not illustrated) of the drive device according to loading of the recording tape cartridge 10 to the drive device. As a result, the door 28 is opened against the biasing force of the biasing member.

Figure 3:
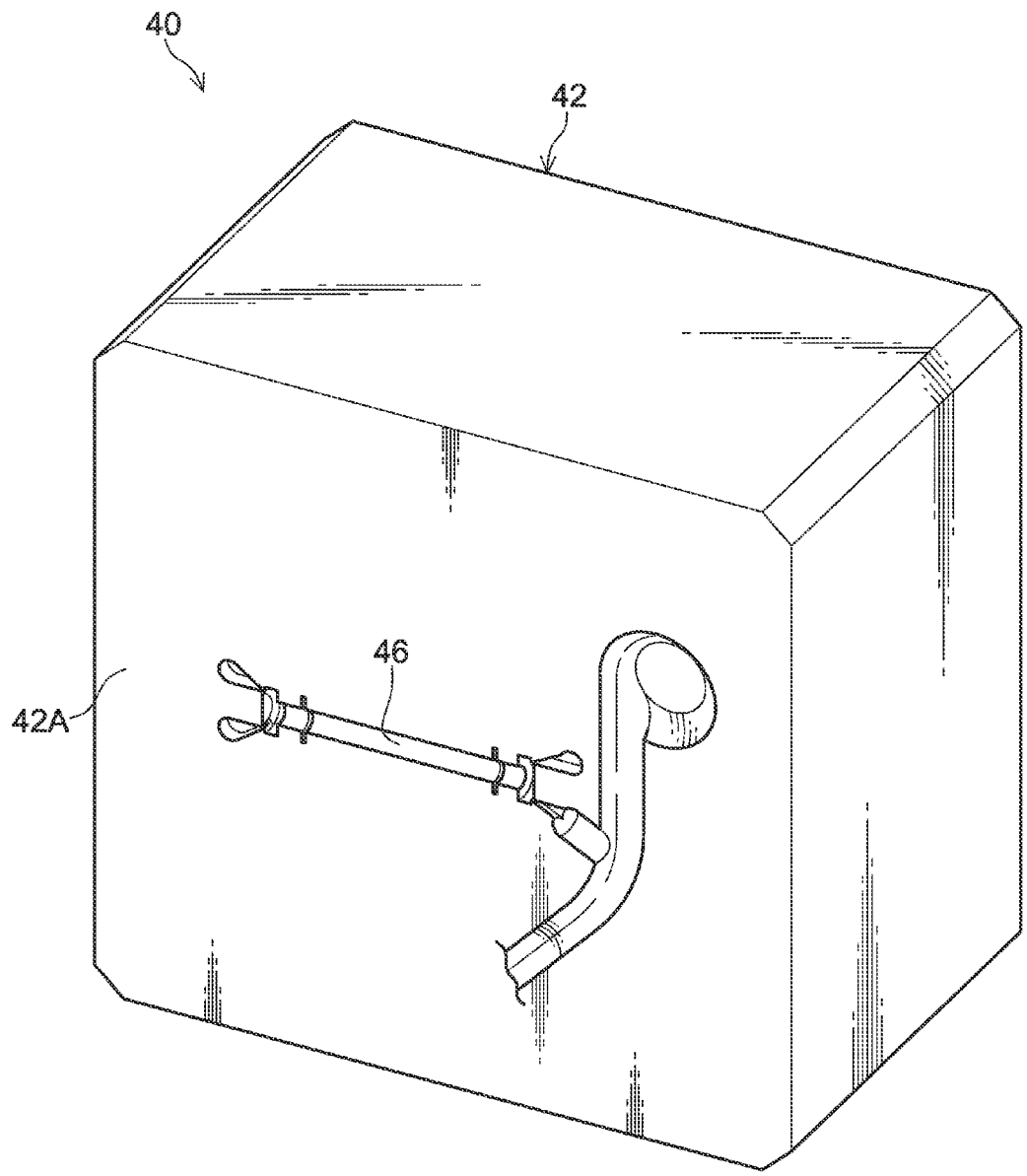
FIG. 3 is a schematic perspective view illustrating a fixed-side mold for manufacturing the leader pin.
Figure 4:
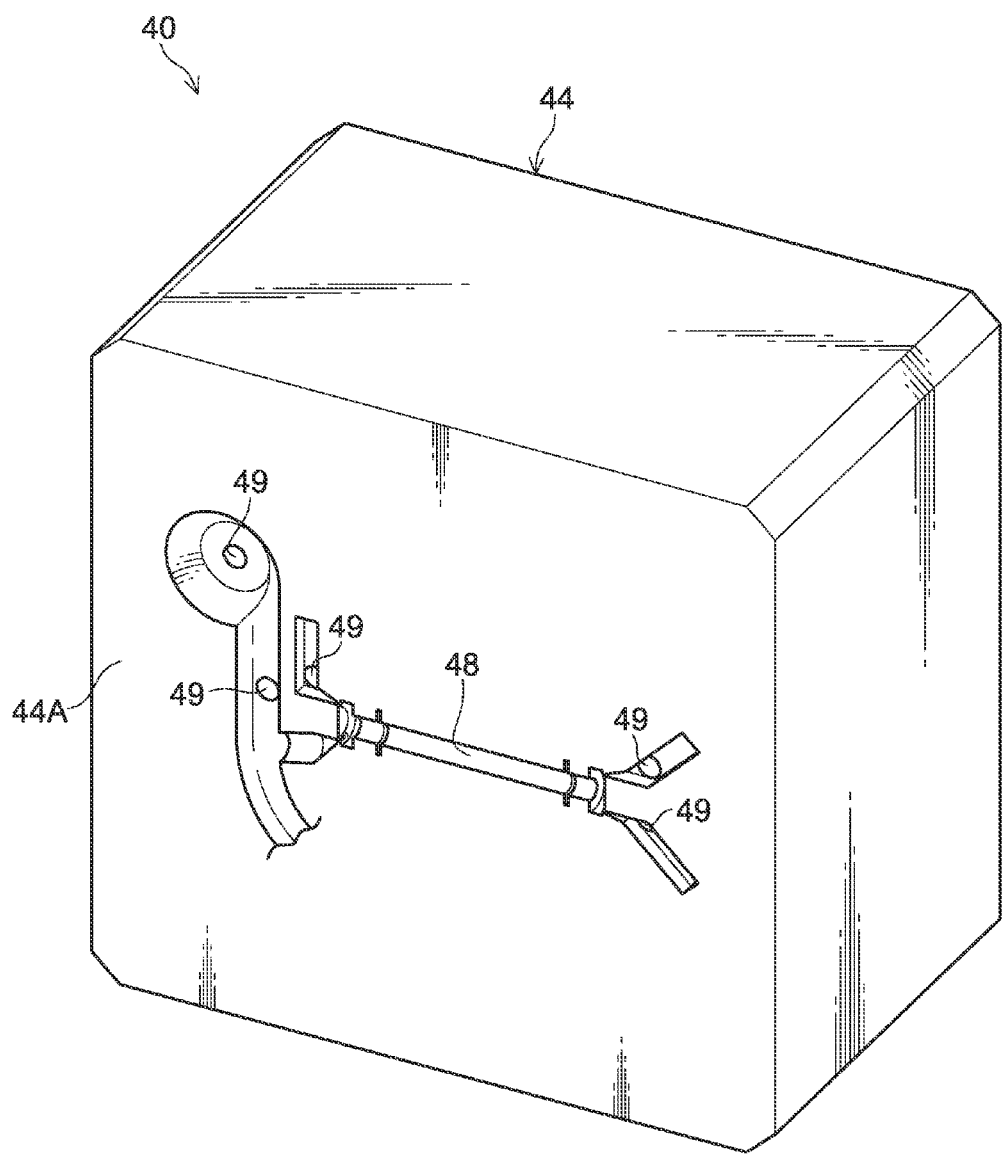
FIG. 4 is a schematic perspective view illustrating a movable-side mold for manufacturing the leader pin.
Figure 5:
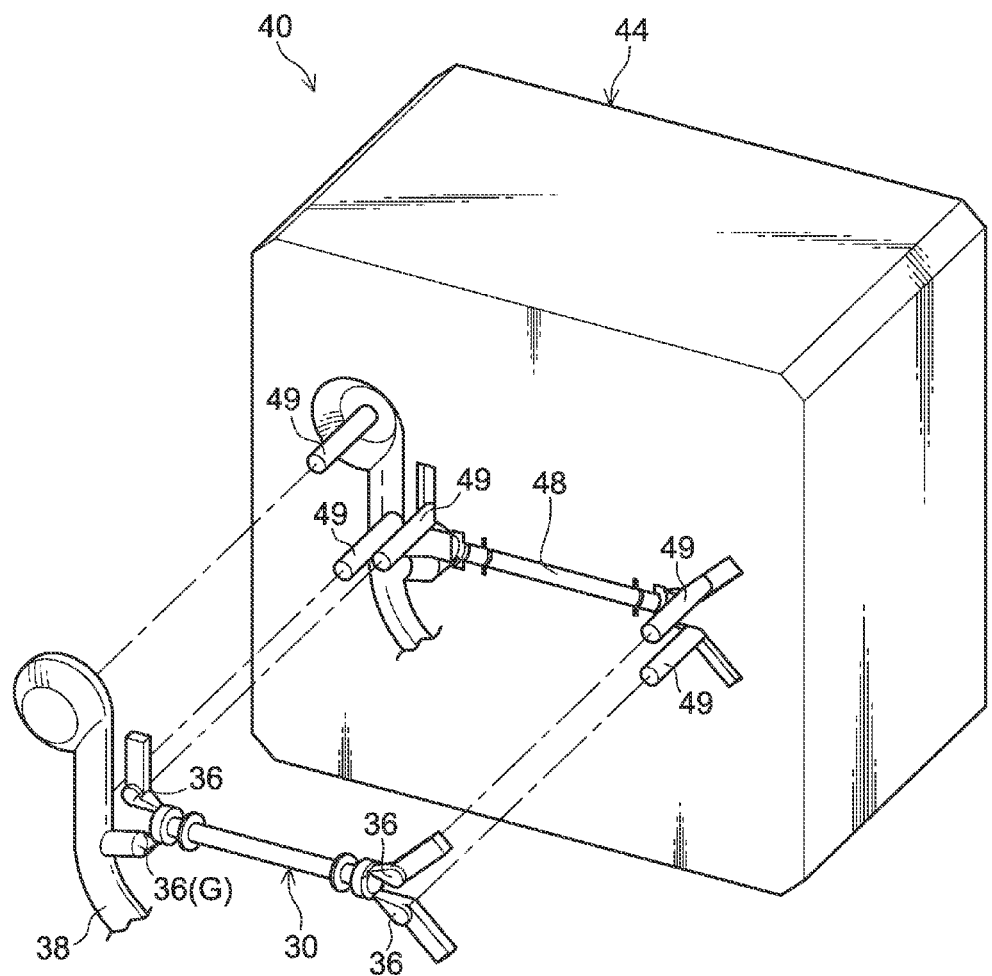
FIG. 5 is a schematic perspective view illustrating the leader pin immediately after being extruded from the movable-side mold.

Next, a leader pin 30 that is an example of the leader member according to the exemplary embodiment in the recording tape cartridge 10 that has the above-described configuration will be described in detail. As illustrated in FIGS. 3 to 5, the leader pin 30 is manufactured by metal injection molding with stainless steel.

That is, the leader pin 30 is manufactured as follows. A mixture that is obtained by kneading particulate powders of the stainless steel and a thermoplastic binder such as polyethylene (PE) is subjected to injection molding by a mold 40 illustrated in FIGS. 3 and 4, thereafter, the thermoplastic binder is degreased (removed) from the molded object, and the molded object is sintered.

The mold 40 that is a metallic mold is configured by a core 42 which is to be the fixed side illustrated in FIG. 3 and a cavity 44 which is to be the movable side illustrated in FIG. 4, and the cavity 44 moves to come close to or be away from the core 42 by a moving mechanism (not illustrated). In matching surfaces 42A and 44A of the core 42 and the cavity 44, concave portions 46 and 48 for forming the leader pin 30 are formed, respectively.

Accordingly, when the leader pin 30 is manufactured, the matching surface 44A of the cavity 44 is matched with the matching surface 42A of the core 42 to be mold clamped, and the above mentioned mixture is press fitted into the concave portions 46 and 48. After the shape of the leader pin 30 is formed, the cavity 44 is separated from the core 42.

As a result, the leader pin 30 (including overflow portions 36 and a runner 38 which will be described in detail below) is taken out from the core 42 in a state where the leader pin 30 is fixed to the cavity 44 side. Then, as illustrated in FIG. 5, the leader pin 30 is pushed out (extruded or ejected out) by plural extrusion (pushing) pins 49 provided in the cavity 44 and is pulled out from the cavity 44. The overflow portions 36 and the runner 38 which will be described in detail below are removed. After the thermoplastic binder is removed, sintering is performed. As a result, the leader pin 30 is manufactured as a product illustrated in FIG. 2.

In this case, when the leader pin 30 (including the overflow portions 36 and the runner 38 which will be described in detail below) is taken out from the cavity 44, extruded (ejected out) portions by the extrusion pins 49 are set to be the overflow portions (portions to be extruded (ejected)) 36 that are integrally connected to the head portions 34 of the leader pin 30, such that the shape of the leader pin 30 as the product is not deformed and damaged by the extrusion pin 49 (such that an ejected mark (trace) such as a step is not formed at the leader pin 30 as the product, by pressing it by the extrusion pin 49).

Figure 6:
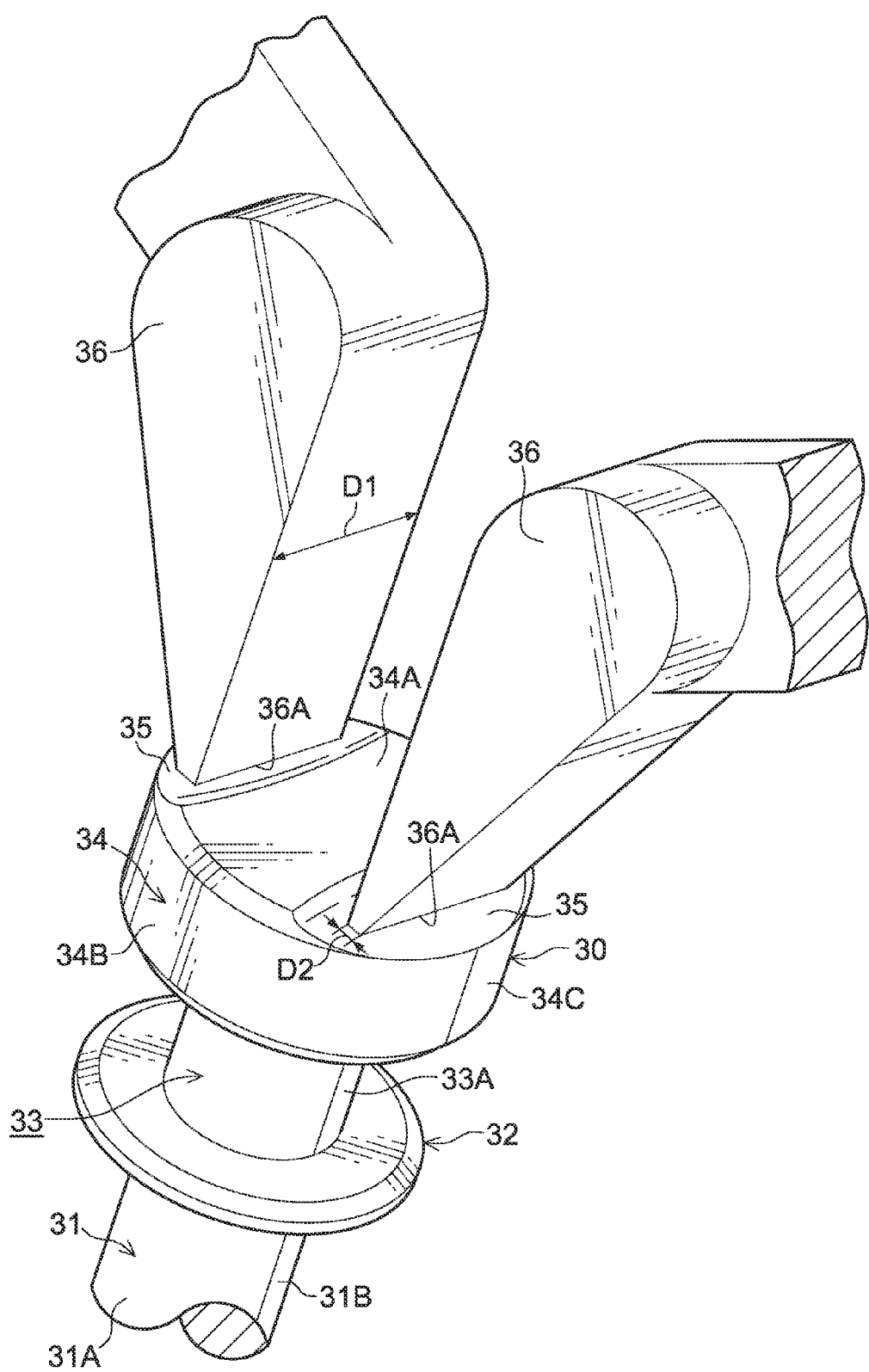
FIG. 6 is a schematic enlarged perspective view of a head portion of the leader pin extruded from the mold.

That is, when the leader pin 30 is manufactured by the metal injection molding, as illustrated in FIG. 6, the overflow portions 36 having a predetermined size are preferably formed in the vicinity of a peripheral edge portion (in the vicinity of a corner portion) in the outer surface 34A of the head portion 34 so as to be joined symmetrical to the left and right sides two by two (that is, two overflow portions 36 are formed at one of the head portions 34 and the other two overflow portions 36 are formed at the other of the head portions 34). One overflow portion 36 (which becomes a gate G) is joined to the runner 38 (refer to FIG. 5) which is formed by a path for press fitting the above mentioned mixture.

As illustrated in FIG. 6, each overflow portion 36 is formed such that the thickness D1 of the overflow portion in a direction extruded by the extrusion pin 49 becomes relatively thick, and rigidity of the overflow portion 36 when being extruded by the extrusion pin 49 is secured. That is, each overflow portion 36 has strength against the force applied in the direction extruded by the extrusion pin 49, and is formed in a shape (thickness) in which sufficient resistance can be secured against the pressing force when being extruded by the extrusion pin 49.

When viewed from the direction extruded by the extrusion pin 49, in each overflow portion 36, the side of a join portion 36A that is joined to the outer surface 34A of the head portion 34 is formed in an approximately wedge shape which is acute angled, and the thickness D2 of the join portion 36A in a direction orthogonal to the direction extruded by the extrusion pin 49 is greatly thin.

Thereby, each overflow portion 36 can be easily removed (cut) from the outer surface 34A of the head portion 34. That is, the join portion 36A in each overflow portion 36 has a shape that is vulnerable against the force applied from the direction orthogonal to the direction extruded by the extrusion pin 49, and that is easily cut (removed) by the force applied from the direction.

In the outer surface 34A of the head portion 34 of the leader pin 30, in a portion of the peripheral edge portion (including an angular portion) that includes a portion where the join portion 36A of each overflow portion 36 is joined, a notch (recess) portion 35 where the thickness of the head portion 34 is reduced is formed with a predetermined size (depth). That is, the join portion 36A of each overflow portion 36 is joined to each notch portion 35.

Thereby, a mark (including the mark of the gate G) that is generated (formed) by (when) removing (cutting) each overflow portion 36 does not protrude further than the outer (top) surface 34A of the head portion 34 of the leader pin 30. That is, when the leader pin 30 is held by the pin holding portions 19 of the case 12, the hindrance of the mark of the gate G can be prevented.

The notch portion 35 is formed in a case where at least the overflow portion 36 (including the gate G) is joined, in the head portion 34 of the leader pin 30. That is, the notch portion 35 may not be formed in a case where the overflow portion 36 is not joined, in the head portion 34 of the leader pin 30.

On the surface (a peripheral surface 31A of the body 31, a peripheral surface 34 B of the head portion 34 and the like) of the leader pin 30 formed in the above way, a parting line (see FIGS. 9A and 9B) is formed (positioned) along the axial direction. In the parting line, as illustrated in FIGS. 9A and 9B, a burr 39 is formed, and/or a step edge 29 is formed when mold clamping is performed in a state where processing dimension difference of the core 42 and the cavity 44 occurs or in a state where the core 42 and the cavity 44 are relatively shifted (miss-alignment occurs).

As illustrated in FIGS. 2 and 7, in the leader pin 30, the dimension (thickness) of a portion that corresponds to the parting line is slightly reduced. That is, in the leader pin 30, at least a portion corresponding to the parting line in the body 31 between the flange portions 32 where the recording tape T is fixed, is dimensionally reduced by the predetermined amount H in a direction orthogonal to the axial direction (H=0.005 mm to 0.04 mm, preferably, 0.01 mm to 0.03 mm) so as to be flat along the axial direction, so that a planar portion 31B is formed at the portion.

In this case, as illustrated in FIGS. 8 to 9A and 9B, the free end of the recording tape T is wound around the body 31 of the leader pin 30, and is pressed and held by a resin clip 37 functioning as a tape catching (latching) member formed in a "C" shape in cross-section view from the outside by elastic force of the clip 37 to be caught (fixed).

Accordingly, as illustrated in FIG. 9B, in the case of a leader pin according to a comparative example where the planar portion 31B of which the thickness is reduced is not formed on the portion corresponding to the parting line of the body 31, because the free end of the recording tape T is pressed and held by the clip 37, it may be damaged by the burr 39 and/or the step edge 29 formed in the parting line of the body 31 or may be cut.

However, as illustrated in FIG. 9A, in the case of the leader pin 30 according to the exemplary embodiment, the planar portion 31B of which the thickness is reduced is formed on the portion corresponding to the parting line of the body 31. Therefore, even though the free end of the recording tape T that is wound around the body 31 of the leader pin 30 is pressed and held by the clip 37, the free end of the recording tape T is prevented from being damaged by the burr 39 and/or the step edge 29 formed (remained) in the parting line of the planar portion 31B or being cut.

In the leader pin 30 illustrated in FIG. 2, portions corresponding to the parting line of the flange portion 32 and the cylindrical groove 33 are also dimensionally reduced, and planar portions 32A and 33A (a substantially planar portion) are formed on the corresponding portions, respectively. However, the planar portions 32A and 33A may not be formed in the corresponding portions. However, in a portion corresponding to the parting line of the peripheral surface 34B of the head portion 34 where the plate spring is engaged, a planar portion (a substantially planar portion) 34C of which the thickness is reduced is preferably formed.

According to this configuration, an engaging defect of the tip end of the plate spring that is engaged with the peripheral surface 34B of the head portion 34 of the leader pin 30 is suppressed or prevented, and generation of a variation in the inserting force and the separating force of the head portion 34 with respect to the pin holding portion 19 by an increase in the outer diameter (diameter of a direction orthogonal to the axial direction) of the portion corresponding to the parting line of the head portion 34 due to the burr 39 and/or the step edge 29 may be reduced.

Figure 10:
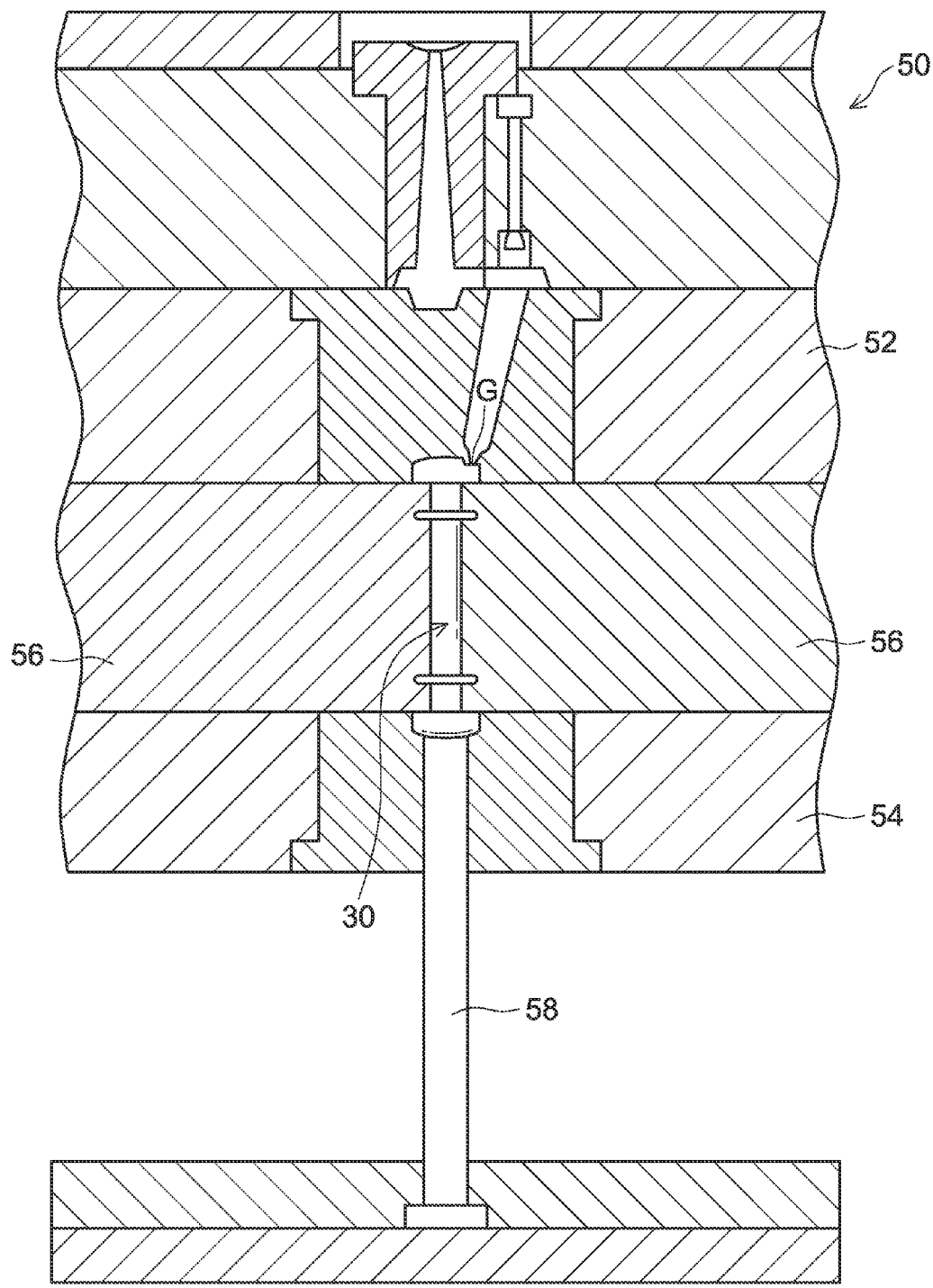
FIG. 10 is a schematic cross-sectional view illustrating another mold for manufacturing the leader pin.
Figure 11:
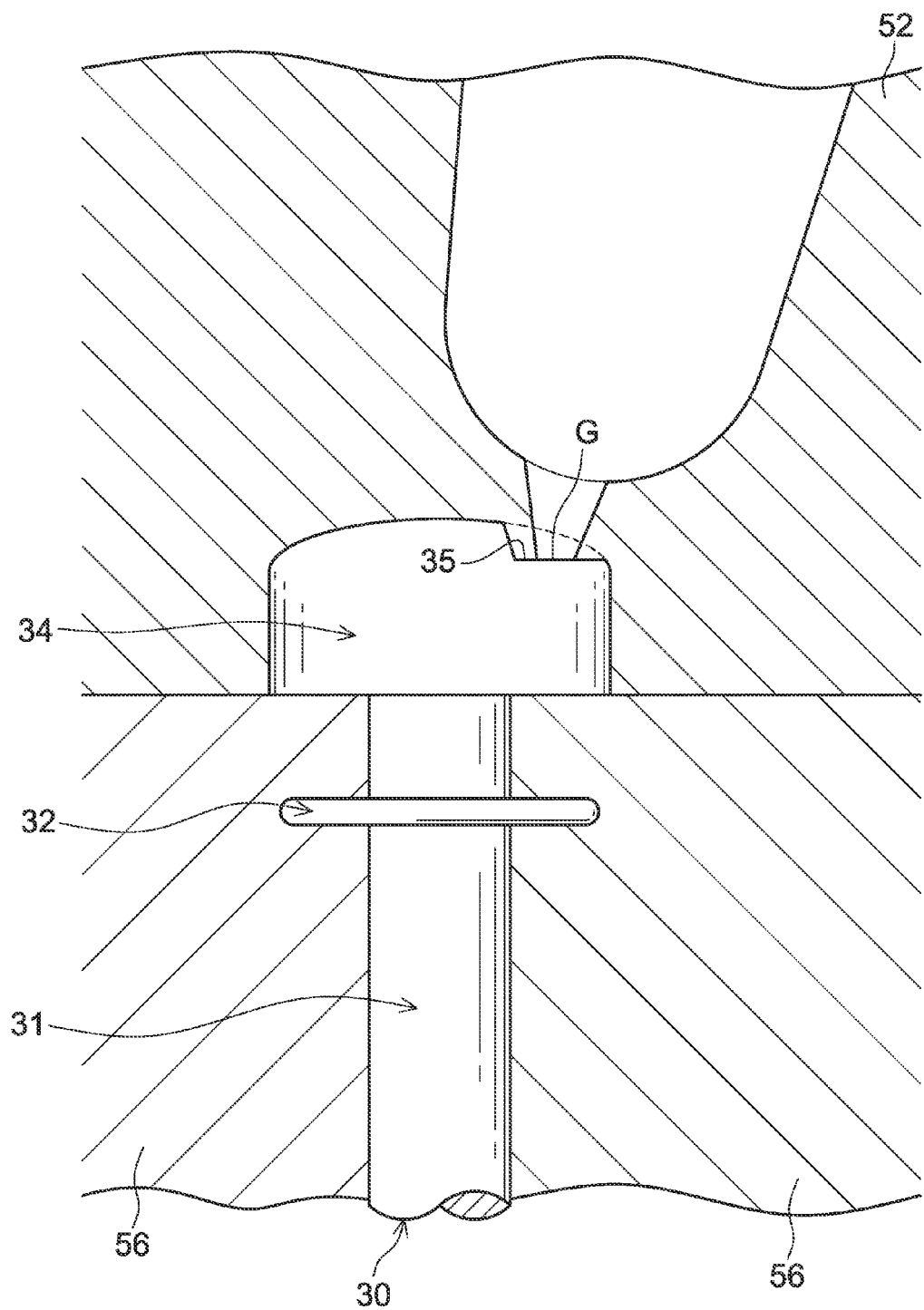
FIG. 11 is a schematic enlarged cross-sectional view illustrating a portion of the mold illustrated in FIG. 10.

The mold that manufactures the leader pin 30 may be a mold 50 that has the structure illustrated in FIGS. 10 to 14. That is, the mold 50 is a mold of a three plates structure that includes a core 52 which is as the fixed side, a cavity 54 which is as the movable side, and a slide core 56 provided between the core 52 and the cavity 54 and sliding in direction of being close or being away each other, and the gate G is a pin gate as illustrated in FIG. 11.

Therefore, in the case of the mold 50, the leader pin 30 is formed as follows. That is, as illustrated in FIGS. 10 and 11, after the core 52 and the slide core 56 and the cavity 54 are mold-clamped, the mixture mentioned above is press fitted from the gate G provided in a portion where one head portion 34 is formed, and is subjected to injection molding, thereafter, the slide core 56 and the cavity 54 are separated from the core 52 by a moving mechanism (not illustrated).

Figure 12:
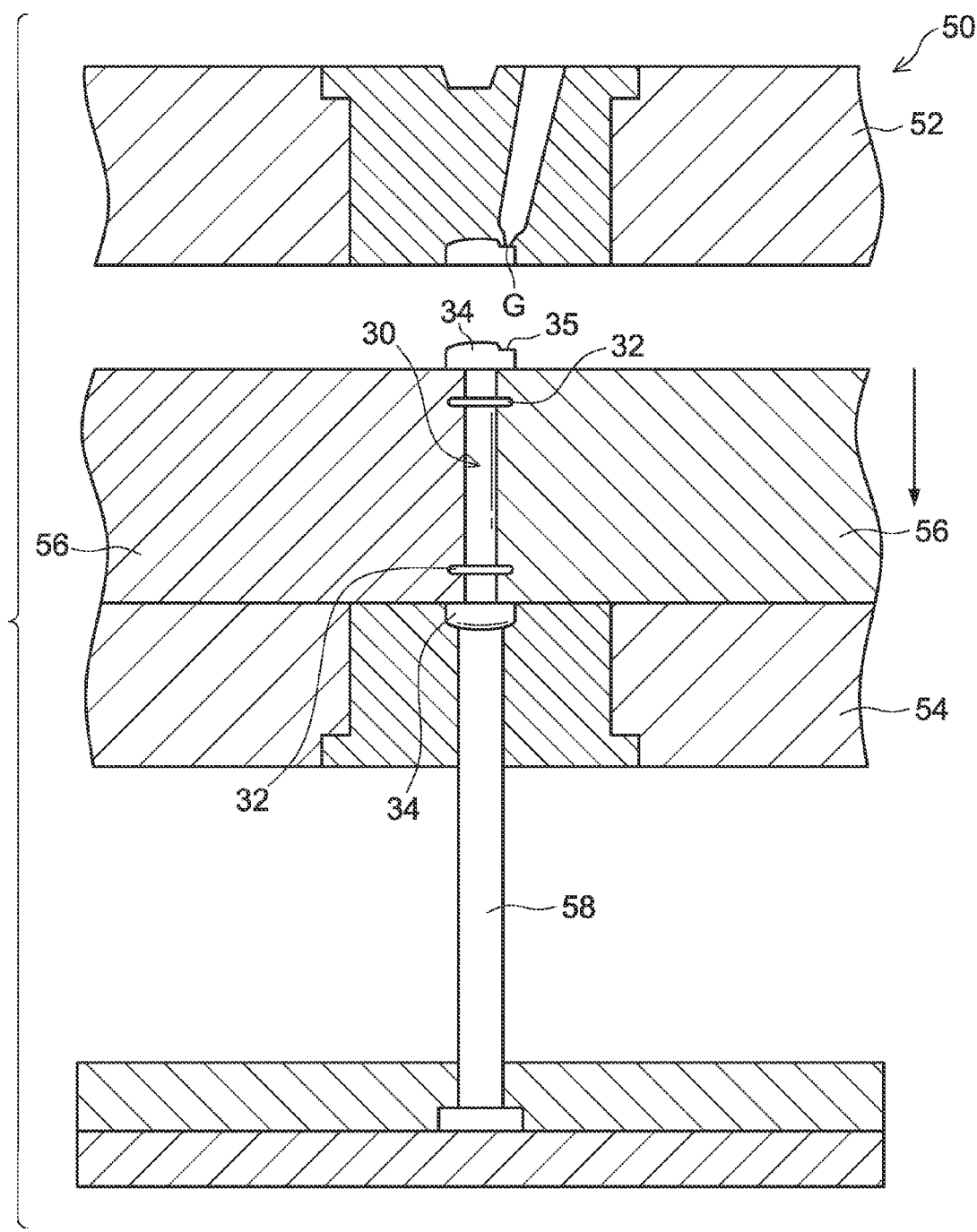
FIG. 12 is a diagram illustrating a state where the movable-side mold is away from the fixed-side mold illustrated in FIG. 10.
Figure 13:
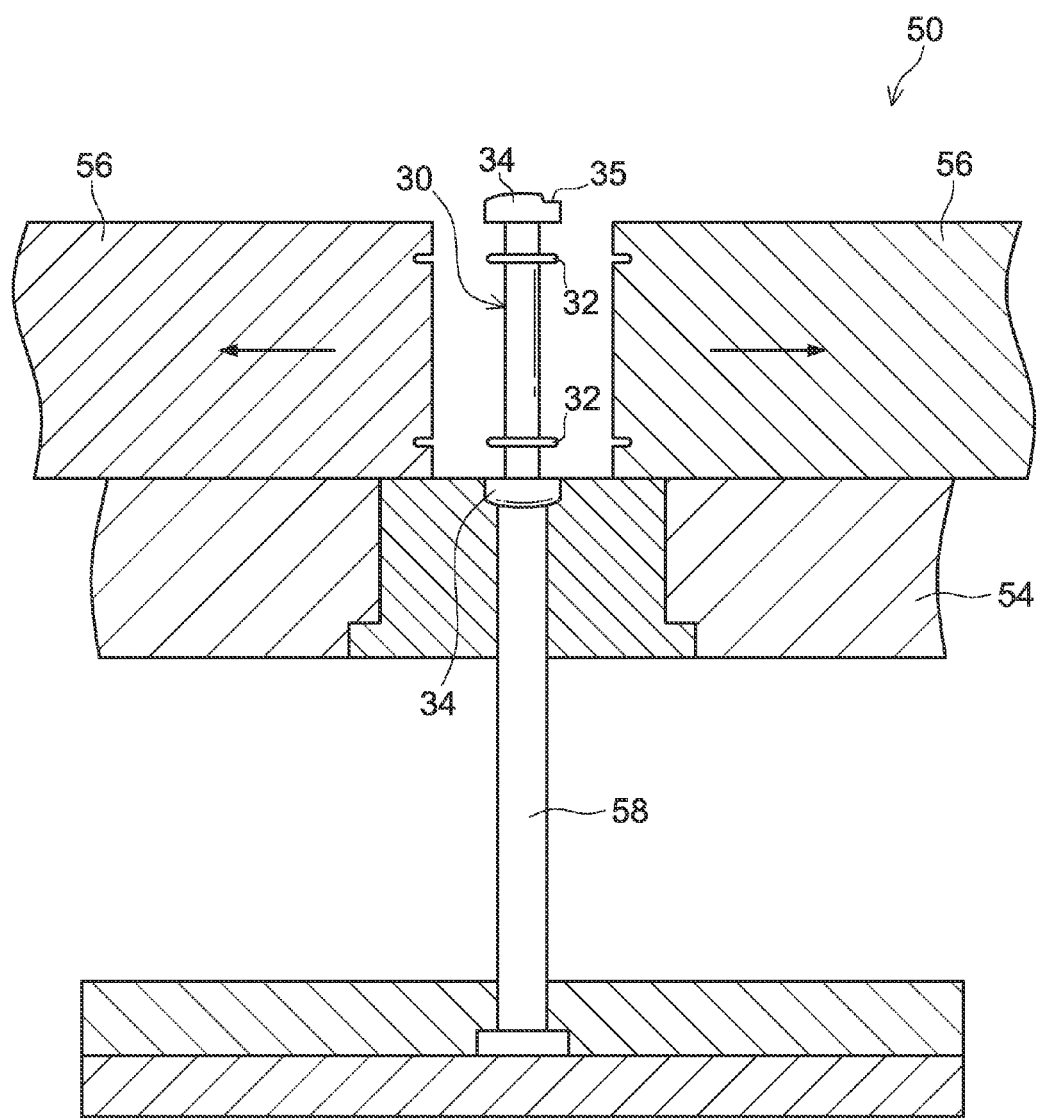
FIG. 13 is a diagram illustrating a state where the mold is further slid from the movable-side mold illustrated in FIG. 10.

In this case, since the gate G is the pin gate and the diameter thereof is extremely small, as illustrated in FIG. 12, the gate G is easily separated from the one head portion 34 of the leader pin 30. Then, as illustrated in FIG. 13, parts of the slide core 56 are moved in separated direction each other. Thereby, the leader pin 30 is held in the cavity 54 via the other head portion 34.

Figure 14:
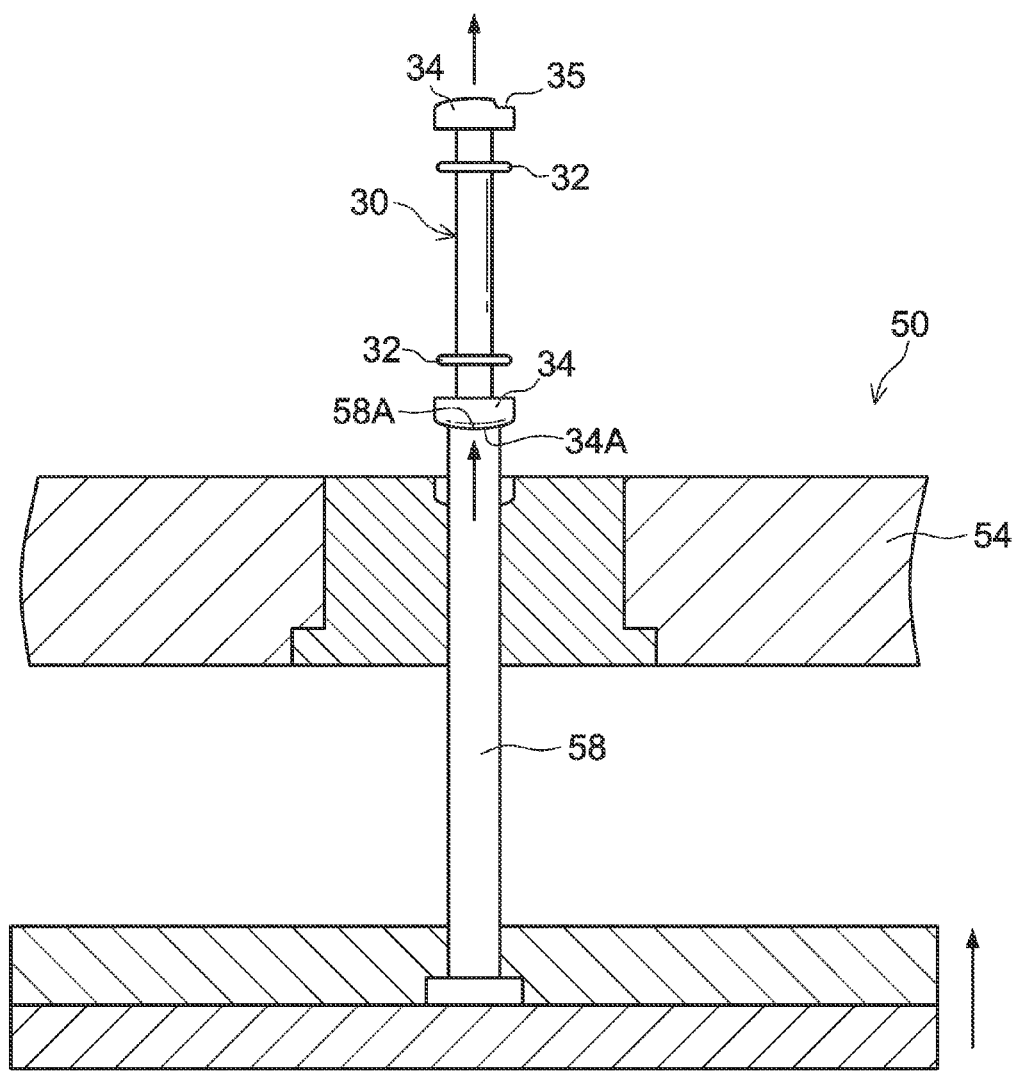
FIG. 14 is a diagram illustrating a state where the leader pin is extruded from the movable-side mold illustrated in FIG. 10.

In this way, when the leader pin 30 is held in the cavity 54 via the other head portion 34, as illustrated in FIG. 14, the leader pin 30 is extruded (ejected) in the axial direction by an extrusion pin 58 where a front end face 58A is recessed in an approximately spherical surface shape (where a shape of the front end face 58A is matched with the shape of the outer surface 34A of the head portion 34), from the side of the outer surface 34A of the other head portion 34 (where the notch portion 35 is not formed), and is taken out from the cavity 54.

Even though the outer surface 34A of the other head portion 34 of the leader pin 30 is extruded (ejected) by the extrusion pin 58, the tip end face 58A of the extrusion pin 58 is formed in a shape matched with the shape of the outer surface 34A of the head portion 34. Therefore, the shape of the outer surface 34A is not damaged.

In this way, from the leader pin 30 that is taken out from the cavity 54, the thermoplastic binder is removed, similar to the manufacturing process using the mold 40 mentioned above, and thereafter, sintering is performed. Similar to the above case, the thickness of the portion corresponding to the parting line is slightly reduced. However, in the case of the leader pin 30 that is manufactured by using the mold 50, the parting line is not formed in the head portion 34. Accordingly, in the leader pin 30 in this case, except for the head portion 34, the thickness of at least the portion corresponding to the parting line of the body 31 is slightly reduced.

Figure 15A:
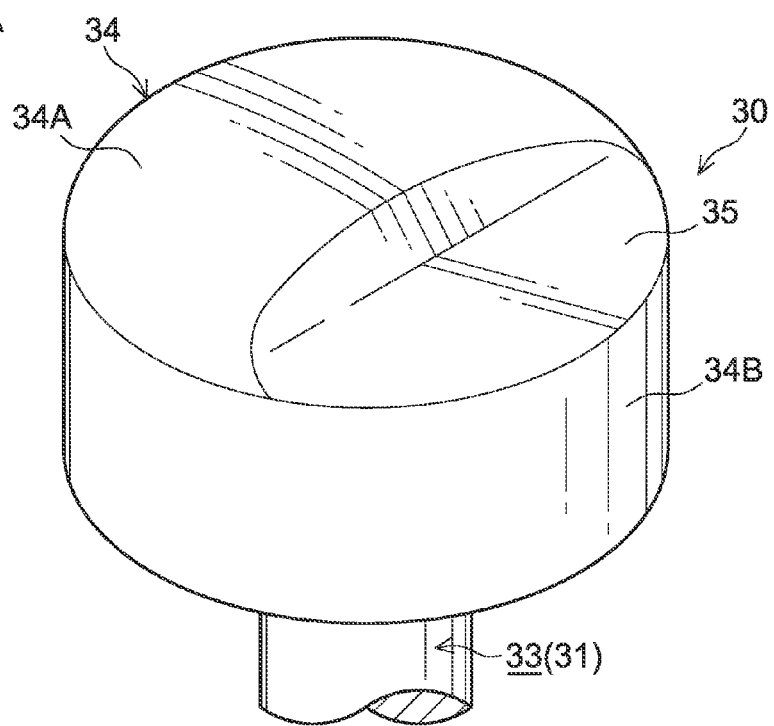
FIGS. 15A and 15B are a schematic enlarged perspective view illustrating a head portion of the leader pin that is manufactured by the mold illustrated in FIG. 10.

In the case of the leader pin 30 that is manufactured by the mold 50, as illustrated in FIG. 11, the gate G is the pin gate. Therefore, as illustrated in FIG. 15A, the notch portion 35 that has the same configuration as the above case may be formed in only a portion of the peripheral edge portion (only one side so as to be asymmetrical to the left and right sides), in one head portion 34.

Figure 15B:
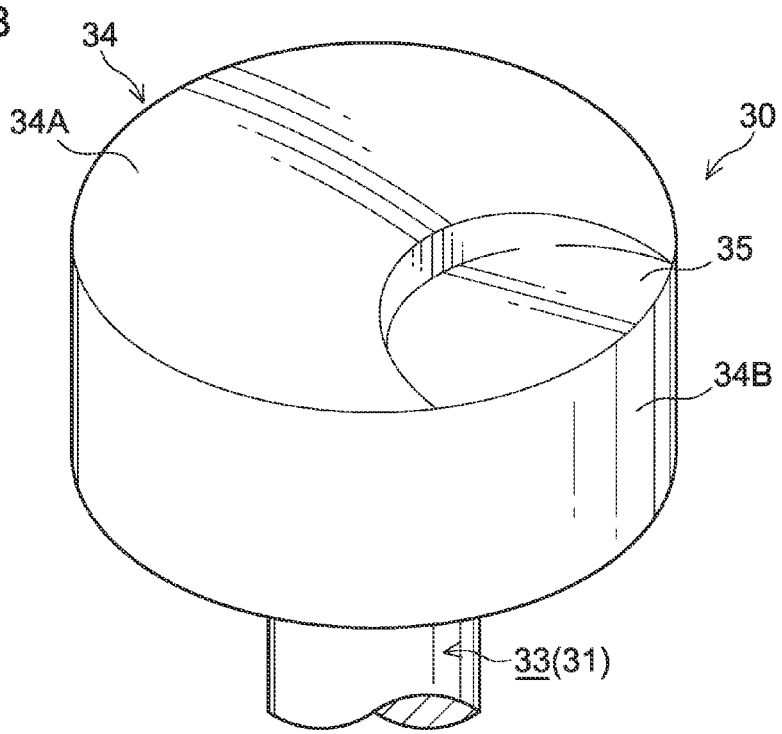

When the gate G is the pin gate, the mark of the gate G is extremely small. For this reason, the shape of the notch portion 35 may be smaller, as illustrated in FIG. 15B. In this case, since an area of the outer surface 34A in one head portion 34 that contacts one pin holding portion 19 can be increased, the leader pin 30 is further stably held by the pin holding portion 19.

Next, an operation and effect, other than the above mentioned operation and effect, of the leader pin 30 that has the above configurations will be described. As described above, the leader pin 30 is manufactured by metal injection molding (the mold 40 or the mold 50) of stainless steel. Therefore, processing of one shot is enabled for 5 to 10 sec. That is, in the case of the leader pin 30 that is manufactured by the metal injection molding of the stainless steel, productivity can be improved, as compared with the case of a leader pin that is manufactured by cutting the stainless steel (not illustrated).

Since the leader pin 30 is formed of stainless steel, the leader pin 30 is excellent in terms of the strength, the rigidity, the corrosion resistance, the low frictional property, and the abrasion resistance. That is, the leader pin 30 has sufficient resistance against sliding by the tip end of the plate spring made of stainless, and has sufficient strength against the bend-deformation force when the recording tape cartridge 10 is dropped. That is, in the leader pin 30 according to the exemplary embodiment that is manufactured by the metal injection molding of the stainless steel, balance of productivity and various characteristics is excellent.

The leader member in the recording tape cartridge 10 and the manufacturing method thereof according to the exemplary embodiment are described based on the exemplary embodiment illustrated in the drawings, but are not limited thereto, and various modifications and changes may be made without departing from the scope of the invention.

For example, in the exemplary embodiment, the leader pin 30 that has the head portions 34 on both ends thereof is described as the example of the leader member, but the leader member according to the exemplary embodiment is not limited to the above example. That is, the invention may be applied to a leader pin (not illustrated) with no head portion that is mounted to a tip end of a leader tape (not illustrated) fixed to the free end of the recording tape T or a leader member (not illustrated) that is called a "buckle" adopted in SDLT.

What is claimed is:

1. A method of manufacturing a leader member in a recording tape cartridge, that is attached to a free end of a recording tape wound around a single reel accommodated in a case, and that is pulled out from an opening formed in the case by a pull out member of a drive device, the method comprising metal injection molding of stainless steel to form the leader member, wherein the leader member is a leader pin having a body on which the free end of the recording tape is wound, wherein a parting line extends along opposing sides of the leader member, and wherein the body of the leader member includes multiple portions, each portion including a planar area extending along the parting line in an axial direction of the leader member at each opposing side of the leader member, and each planar area being flat when compared with non-planar areas of the body.

2. The method of manufacturing a leader member in a recording tape cartridge of claim 1, wherein:

the leader pin has head portions on both ends thereof, and a notch portion is formed in at least one of the head portions, the notch portion being configured such that a gate mark, which is formed at the at least one of the head portions when the leader pin is manufactured, does not protrude further than a top surface of the at least one of the head portions.

3. The method of manufacturing a leader member in a recording tape cartridge of claim 1, wherein the multiple portions are opposing portions of the body which are opposed each other, and the opposing portions are configured such that the opposing portions sandwich an axial center of the leader pin.

* * * * *